(12) United States Patent
Vismans et al.

(10) Patent No.: US 7,783,471 B2
(45) Date of Patent: Aug. 24, 2010

(54) COMMUNICATION DEVICE FOR EMULATING A BEHAVIOR OF A NAVIGATION DEVICE

(76) Inventors: David Vismans, Wilemsparkweg 12 III, Amsterdam, North Holland (NL) 1017 HE; Michiel Salters, Bosboom Toussaintplein 147, Delft, South Holland (NL) 2624 DK; James Tebbutt, Korte Amstelstraat 12F, Amsterdam, North Holland (NL) 1018 XS ( * ) Notice: Subject to any disclaimer, the term of this patent is extended or adjusted under 35 U.S.C. 154(b) by 487 days.

(21) Appl. No.: 11/711,866

(22) Filed: Feb. 28, 2007

(65) Prior Publication Data

US 2007/0260445 A1 Nov. 8, 2007

(30) Foreign Application Priority Data

| Mar. 8, 2006 | (GB) | .................................... 0604704 |
| Mar. 8, 2006 | (GB) | .................................... 0604706 |
| Mar. 8, 2006 | (GB) | .................................... 0604706 |
| Mar. 8, 2006 | (GB) | .................................... 0604709 |
| Mar. 8, 2006 | (GB) | .................................... 0604710 |

(51) Int. Cl.
*G06F 9/455* (2006.01)

(52) U.S. Cl. ........................................ 703/26; 717/122

(58) Field of Classification Search ................... 703/24, 703/26; 707/203; 717/120–122; 701/208
See application file for complete search history.

(56) References Cited

U.S. PATENT DOCUMENTS

| 7,209,874 | B2 * | 4/2007 | Salmonsen | ................... 703/23 |
| 2003/0191623 | A1 * | 10/2003 | Salmonsen | ................... 703/24 |
| 2006/0155387 | A1 * | 7/2006 | Pieronek | ......................... 700/1 |
| 2007/0239353 | A1 * | 10/2007 | Vismans et al. | ............. 701/208 |
| 2007/0266177 | A1 * | 11/2007 | Vismans et al. | ............. 709/243 |
| 2007/0266239 | A1 * | 11/2007 | Vismans et al. | ............. 713/159 |
| 2007/0275733 | A1 * | 11/2007 | Vismons et al. | .......... 455/456.3 |
| 2008/0208853 | A1 * | 8/2008 | Vismans et al. | ................ 707/6 |

* cited by examiner

*Primary Examiner*—Russell Frejd
(74) *Attorney, Agent, or Firm*—Jacob Elsenberg

(57) ABSTRACT

The invention provides a communication device for emulating a behavior of a navigation device in response to executing a device firmware program installed on the navigation device. The communication device comprises a provider for providing information relating to the device firmware program, a determiner for determining whether a current firmware program installed on the communication device corresponds to the device firmware program installed on the navigation device and a processor for executing the current firmware program on the communication device in order to emulate the behavior of the navigation device if the current firmware program corresponds to the device firmware.

12 Claims, 7 Drawing Sheets

COMMUNICATION DEVICE FOR EMULATING A BEHAVIOR OF A NAVIGATION DEVICE

FIELD OF THE INVENTION

The present invention relates to information technologies in particular in the field of mobile navigation.

BACKGROUND OF THE INVENTION

The increasing demand for mobile navigation devices imposes several restrictions related to e.g. managing navigation contents (navigation items like routing information, traffic information, map information etc.), providing e.g. user specific navigation contents to navigation devices, operating the navigation devices or managing the executable programs installed e.g. on the navigation device.

However, the increasing complexity of navigation devices and the increased demand for information implicate problems associated with efficiently managing the information and operating the navigation device.

SUMMARY OF THE INVENTION

It is the object of the invention to provide a concept for emulating a behavior of a navigation device in response to executing a device firmware program installed on the navigation device even if e.g. the version of the device firmware is not known.

This object is achieved by the features of the independent claims.

The invention is based on the finding that the behavior of the navigation device may be emulated using another program provided that the other program emulates the device firmware installed on the navigation device. Thus, the other program may be installed as e.g. an embedded emulator on another device and executed for emulating the navigation device. However, prior to emulating the navigation device, it has to be ensured that the other program corresponds to the device firmware, e.g. that a source code of the other program corresponds to the source code of the device firmware. Thus, the user can work with the navigation device using the emulating program even if the navigation device is switched off.

An embodiment provides a communication device for emulating a behavior of a navigation device in response to executing a device firmware program installed on the navigation device. Preferably, the communication device comprises a provider for providing information relating to the device firmware program, a determiner for determining whether a current firmware program installed on the communication device corresponds to the device firmware program installed on the navigation device and a processor for executing the current firmware program on the communication device in order to emulate the behavior of the navigation device if the current firmware program corresponds to the device firmware.

According to a further embodiment, the processor may establish a network connection to a remote network entity via a communication network to obtain an updated version of the current firmware program if the current firmware program does not correspond to the device firmware program. Furthermore, the processor may execute the updated version of the current firmware program to emulate the behavior of the navigation device.

According to a further embodiment, the provider may connect to the navigation device for retrieving information indicating the device firmware program.

According to a further embodiment, the determiner may determine whether the current firmware program installed on the communication device corresponds to the device firmware upon a basis of a table of contents file comprising information indicating the device firmware program or upon a basis of a table of contents file comprising information indicating the current firmware program.

According to a further embodiment, the processor may control the navigation device upon a basis of the emulation of the behavior of the navigation device.

Another embodiment provides a method for emulating a behavior of a navigation device in response to executing a device firmware program installed on the navigation device. The method comprises providing information relating to the device firmware program from the navigation device, determining whether a current firmware program corresponds to the device firmware installed on the navigation device and executing the current firmware program on a communication device in order to emulate the behavior of the navigation device if the current firmware program corresponds to the device firmware.

According to another embodiment, the method comprises comprising establishing a network connection to a remote network entity via a communication network to obtain an updated version of the current firmware program if the current firmware program does not correspond to the device firmware program and executing the updated version of the current firmware program to emulate the behavior of the navigation device.

According to another embodiment provides, the method comprises connecting to the navigation device for retrieving information indicating the device firmware program.

According to another embodiment, the method comprises determining whether the current firmware program corresponds to the device firmware program upon a basis of a table of contents file comprising information indicating the device firmware program or upon a basis of a table of contents file comprising information indicating the current firmware program.

Another embodiment provides a programmably arranged communication device for emulating a behavior of a navigation device in response to executing a device firmware program installed on the navigation device. The programmably arranged communication device may execute a first computer program for providing information relating to the device firmware program, execute a second computer program for determining whether a current firmware program available to the programmably arranged communication device corresponds to the device firmware program installed on the navigation device and execute the current firmware program on the communication device in order to emulate the behavior of the navigation device if the current firmware program corresponds to the device firmware program.

Preferably, the programmably arranged communication device is configured to perform the steps of the method described above.

According to another aspect, a programmably arranged entity can control a further entity by transmitting or requesting to transmit a certain command for controlling the further programmably arranged entity to a non-existing, i.e. to a dummy, network address. The transmission or the request for transmission may be intercepted by an additional programmably arranged (e.g. control) entity which provides the certain command to the further programmably arranged entity. Thus, the commands are indirectly distributed which reduces the additional complexity. In this regard, the term "programmably arranged entity" may refer to programmably arranged means or to a computer program being capable of running on a computer.

An embodiment provides a communication device with a programmably arranged first means, a programmably arranged second means, and a programmably arranged third means. The programmably arranged first means may be configured to request the programmably arranged second means to transmit the certain command to a non-existing network address, e.g. a dummy address. The programmably arranged second means may be configured to inform the programmably arranged third means about the request to transmit the certain command. In response to the information indicating the request, the programmably arranged third means may execute the certain command. Therefore, the programmably arranged first means can indirectly control the programmably arranged third means even if programmably arranged first means cannot directly interact with the programmably arranged third means.

According to a further embodiment, the programmably arranged second means may execute a second computer program providing a Virtual Machine providing e.g. a host or an environment for another program. Hence, the programmably arranged first means may execute a first computer program on the Virtual Machine. Therefore, the first computer program runs on the Virtual Machine provided by the second computer program, so that the second computer program may supervise the first computer program and e.g. capture the request.

According to a further embodiment, the first computer program comprises a non-executable script. Furthermore, the second computer program may provide, when executed, a network browsing functionality, e.g. a web browser. In addition, the third computer program may provide, when executed, a user application, for example a user environment (e.g. a home application).

Another embodiment provides a communication device being configured to execute a first computer program, a second computer program and a third computer program, the first computer program requesting the second computer program to transmit a certain command to a non-existing network address, the second computer program informing the third computer program about the request for transmitting the certain command, the third computer program executing the certain command in response to the information indicating the request. Thus, when executed, the first computer program can indirectly control the third computer program even if e.g. the first computer program does not comprise an executable routine for directly interacting with the third computer program.

According to a further embodiment, the second computer program may provide, when executed, a Virtual Machine, wherein the first computer program may run on the Virtual Machine provided by the second computer program. Thus, when executed e.g. on e computer, the first computer program provides by virtue of the Virtual Machine an environment enabling supervising the first computer program and capturing the request and, indirectly, the certain command.

According to a further embodiment, the first computer program may provide a non-executable script, the second computer program may provide a network browsing functionality, e.g. a web browser, and the third computer program may provide a user application, e.g. a user environment.

For example, the certain command indicates e.g. establishing a network connection to a remote network entity via a communication network by the third computer program.

Another embodiment provides a communication method comprising requesting a first computer program by a second computer program to transmit a certain command to a non-existing network address, providing information indicating the request to a third computer program and executing the certain command by the third computer program in response to the information indicating the request to transmit the certain command.

Another embodiment provides a computer program comprising a first computer program, a second computer program and a third computer program, the first computer program, when running on a computer, requesting the second computer program to transmit a certain command to a non-existing network address, the second computer program, when running on a computer, informing the third computer program about the request to transmit the certain command, the third computer program, when running on a computer, executing the certain command in response to the information about the request.

According to another aspect, a standard uniform resource identifier field (URI) provided by a variety of programs or programmably arranged entities may form an interface for e.g. indirectly interacting with the computer program or with the programmably arranged entity. Thus, the already existing resources are efficiently exploited.

An embodiment provides a processing device for detecting a certain computer command in a string of characters representing a uniform resource identifier, the certain command comprising a predefined command header, the command header being followed by a command name from a plurality of predefined command names. The processing device comprises a determiner for determining whether the string of characters comprises the predefined command header, wherein the determiner may further determine whether a sub-string of characters following the command header comprises the command name if the string of characters comprises the predefined command header. The processing device further comprises a provider for providing the predefined command header and the command name if the command header comprises a command name as the certain computer command. The command structure comprising the predefined command header and the command name following the command header allows a low complexity identification of the certain command in the URI.

According to a further embodiment, the determiner may determine whether a further sub-string of characters following the command name comprises at least one command argument if the sub-string of characters following the command header comprises the command name. Furthermore, the determiner may determine whether the at least one command argument corresponds to a predetermined parameter of the certain command. The provider may provide the predefined command header, the command name and the at least one command argument as the certain computer command if the at least one command argument corresponds to the predetermined parameter. Thus, the certain computer command is composed upon a basis of the detected command parts in the URI and may e.g. be executed by e.g. a processor.

According to a further embodiment, the processing device may comprise e.g. a programmably arranged processor for executing the certain command.

Another embodiment provides a method for detecting a certain computer command in a string of characters representing a uniform resource identifier, the certain command comprising a predefined command header, the command header being followed by a command name from a plurality of predefined command names. The method comprises determining whether the string of characters comprises the predefined command header, determining whether a sub-string of characters following the command header comprises the command name if the string of characters comprises the predefined command header and providing the predefined command header and the command name if the command header comprises a command name as the certain computer command.

According to a further embodiment, the command name is followed by one or more command arguments and the method comprises determining whether a further sub-string of characters following the command name comprises at least one command argument if the sub-string of characters following the command header comprises the command name and providing the predefined command header, the command name and the at least one command argument as the certain computer command if the further sub-string of characters following the command name comprises the at least one command argument.

According to a further embodiment, the method comprises determining whether a further sub-string of characters following the command name comprises at least one command argument if the sub-string of characters following the command header comprises the command name, determining whether the at least one command argument corresponds to a predetermined parameter of the certain command and providing the predefined command header, the command name and the at least one command argument as the certain computer command if the at least one command argument corresponds to the predetermined parameter.

According to a further embodiment, the predetermined parameter separates the command name and a further command argument and the method further comprises providing the predefined command header, the command name and the at least one command argument and the further command argument as the certain computer command.

According to a further embodiment, the certain command indicates establishing a network connection to a remote network entity via a communication network for obtaining user specific information.

According to a further embodiment, the method comprises programmably executing the certain computer program.

According to another aspect, certain information can timely be provided if, in response to a request for the certain information provided to the remote server, instead of transmitting the certain information, time information is provided which indicates a time instant at which again to connect to the remote server for obtaining the certain information. Thus, the problems associated with managing or evaluating obsolete information by e.g. a user are avoided.

An embodiment provides a method for providing certain information to a network entity (e.g. a communication device) from a further network entity (e.g. a network server). The method comprises transmitting a request for the certain information from the network entity via a communication network to the further network entity and transmitting time information from the further network entity to the network entity via the communication network, the time information indicating a certain time instant at which to connect to the further network entity for obtaining the certain information.

According to a further embodiment, the method comprises establishing a network connection between the network entity and the further network entity at the certain time instant and transmitting the certain information from the further network entity to the network entity via the communication network.

According to a further embodiment, the method comprises establishing a connection between the network entity and the further network entity at the certain time instant, transmitting the certain information from the further second network entity to the network entity via the communication network and displaying the certain information by the network entity.

According to a further embodiment, the method comprises receiving the request for the certain information by the network entity.

According to a further embodiment, the certain information comprises traffic information related to a user-specific navigation route.

According to a further embodiment, the method comprises storing the request in the further network entity.

Another embodiment provides a network entity for obtaining certain information from a further network entity via a communication network. The network entity may transmit a request for the certain information via a communication network to the further network entity and to receive time information via the communication network from the further network entity, the time information indicating a certain time instant at which to connect to the further network entity for obtaining the certain information.

According to a further embodiment, the network entity according may connect to the further network entity at the certain time instant for obtaining the certain information.

Another embodiment provides a network entity for providing a certain information to a further network entity via a communication network in response to a request for the certain information transmittable by the further communication entity via the communication network, the network entity being configured to transmit time information via the communication network, the time instant indicating a time instant at which to connect to the network entity to obtain the certain information.

According to a further embodiment, the network entity may transmit the certain information at the certain time instant to the further network entity if the further network entity has established a network connection to the network entity.

According to another aspect, navigation contents (which may be user-specific) can efficiently be managed on a remote server being accessible via a communication network. Preferably, the remote server provides the navigation contents in dependence on e.g. navigation contents currently installed on the navigation device user or device entitlement or other parameters. Thus, updated navigation contents may be custom-tailored at the remote server which reduces a complexity of the navigation device or of computer programs managing the same.

An embodiment provides a communication device for updating current navigation contents stored in a navigation device. The communication device comprises a retrieving element for retrieving information indicating current navigation contents from the navigation device, a transmitter for transmitting the information indicating the current navigation contents to a remote network device via a communication network, a receiver for receiving updated navigation contents from the remote communication device and a processor for displaying information relating to the updated navigation contents or for installing the updated navigation contents on the navigation device.

According to a further embodiment, the retrieving element may retrieve information indicating device identification or user identification from the navigation device, wherein the transmitter may transmit the device of user identification to the remote communication device.

According to a further embodiment, the transmitter may transmit the information indicating the current navigation contents as meta data or as a table of contents file.

According to a further embodiment, the retrieving element may connect to the navigation device for obtaining current navigation contents from the navigation device. For example, the retrieving element or the communication device may wirelessly connect to the navigation device. According to another embodiment, the navigation device or the communication device may by connectable to the retrieving element via a wire, so that the retrieving element may initiate a wired connection to the navigation device (or vice versa).

Another embodiment provides a method for updating current navigation contents stored in a navigation device. Preferably, the method comprises retrieving information indicating current navigation contents from the navigation device, transmitting the information indicating the current navigation contents to a remote network device via a communication network, receiving updated navigation contents from the remote communication device and displaying information relating to the updated navigation contents or installing the updated navigation contents on the navigation device.

According to another embodiment, the method comprises retrieving information indicating device identification or user identification from the navigation device or transmitting the device of user identification to the remote communication device.

According to another embodiment, the method comprises transmitting the information indicating the current navigation contents as meta data or as a table of contents file.

According to another embodiment, the method comprises verifying the entitlement of a user associated with the navigation device or verifying the entitlement of the navigation device for obtaining certain updated navigation contents.

According to another embodiment, the navigation contents or the updated navigation contents comprise information indicating routing information or updated firmware or map information.

According to another embodiment, the information indicating the updated navigation contents comprises priority information indicating that a certain navigation content has a higher priority than another navigation content.

According to another aspect, if a (e.g. executable) computer command comprises a command name and one or more command arguments (e.g. a list of command arguments), then a cryptographically verifiable computer command with reduced overhead may be obtained when e.g. automatically signing the command name and composing a verifiable computer command using the (signed) command name and its cryptographic signature as additional argument.

An embodiment provides a method for providing a cryptographically signed command, the command comprising a command name and at least one command argument. The method comprises generating a cryptographic signature of the command name and composing the cryptographically signed command using the command name, the signature and the at least one command argument.

According to a further embodiment, the method comprises comprising concatenating the command name, the cryptographic signature of the command name and the at least one command argument for composing the cryptographically signed command.

According to a further embodiment, the method comprises generating the cryptographic signature of the command name upon a basis of an asymmetric cryptographic algorithm, in particular the RSA (Rivest-Shamir-Adleman) algorithm, or upon a basis of a digital signature algorithm.

According to a further embodiment, the command name indicates determining a navigation route to a destination determined by the at least one command argument and/or indicates providing a navigation map determined by address data indicated by the at least one command argument or executing a computer program with the at least one command argument.

Another embodiment provides a method for providing a cryptographically verified command upon a basis of a cryptographically signed command, the cryptographically signed command comprising a command name, a cryptographic signature of the command name and at least one command argument. The method the method comprises decrypting the cryptographic signature to obtain a first cryptographic value, processing the command name to obtain a second cryptographic value, comparing the first and the second cryptographic value to obtain a comparison result and providing or executing the command name and the at least one command argument as the cryptographically verified command in dependence of the comparison result.

According to a further embodiment, the first cryptographic value comprises a hash value of the cryptographic signature and the second cryptographic value comprises a hash value of the command name.

According to a further embodiment, the method comprises providing or executing the cryptographically verified command if the first and the second cryptographic value are equal. For example, the method further comprises comparing the hash values.

Another embodiment provides a device for providing a cryptographically signed command, the command comprising a command name and at least one command argument. The device comprises a generator for generating a cryptographic signature of the command name and a composer for composing (e.g. concatenating) the cryptographically signed command using the command name, the signature and the at least one command argument.

Preferably, the device (or its elements) is configured to perform the above-described method steps for providing the cryptographically signed command.

Another embodiment provides a device for providing a cryptographically verified command upon a basis of a cryptographically signed command, the cryptographically signed command comprising a command name, a cryptographic signature of the command name and at least one command argument. The device comprises a decryptor for decrypting the cryptographic signature to obtain a first cryptographic value, a processor for processing the command name to obtain a second cryptographic value, a comparator for comparing the first and the second cryptographic value to obtain a comparison result and a provider for providing or executing the command name and the at least one command argument as the cryptographically verified command in dependence of the comparison result.

Preferably, the device (or its elements) is configured to perform the above-described method steps for providing the cryptographically verified command.

Another embodiment provides a computer program for performing at least one of the inventive methods when the computer program runs on a computer.

BRIEF DESCRIPTION OF THE DRAWINGS

Further embodiments of the present invention will be described with respect to the following figures, in which.

DETAILED DESCRIPTION OF THE INVENTION

Figure 1:
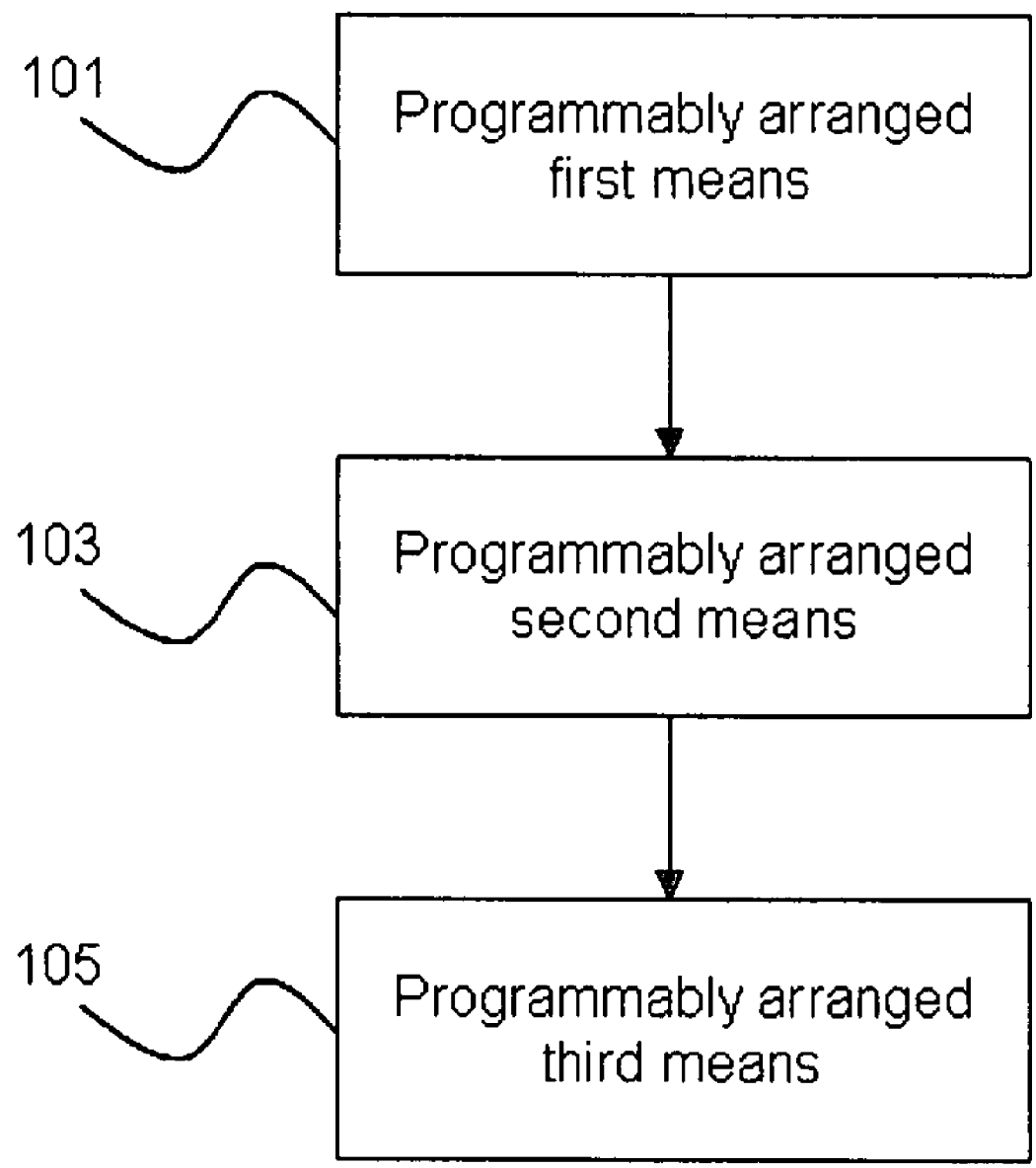
FIG. 1 shows a block diagram of a communication device.

FIG. 1 shows a block diagram of a communication device comprising a programmably arranged first means 101, a programmably arranged second means 103 connected to the programmably arranged first means 101 and a programmably arranged third means 105 connected to the programmably arranged first means 105.

The programmably arranged first means 101 requests the programmably arranged second means to transmit the certain command to a non-existing network address, i.e. to a not existing HTTP-address. In response thereto, the programmably arranged second means 103 informs the programmably arranged third means 105 about the request to transmit the certain command. In response to the information indicating the request, the programmably arranged third means 105 executes the certain command in response to the information indicating the request.

The programmably arranged first means 101 may e.g. execute a first program comprising a non-executable script, e.g. a Java script, within an environment provided by a second computer program (e.g. a web browser) being executable by the programmably arranged second means 103.

The programmably arranged third means 103 preferably executes a third computer program, e.g. a user application (home application), which receives the command because the first computer program asks the environment in which it runs (the web browser, and transitively the user application) to send the command on its behalf. The web browser (the second computer program) is provided because the Java script exists on a webpage and cannot directly communicate with the third computer program.

For example, the above concept may be employed for managing navigation contents like e.g. routing information or routing maps. For example, the first computer program may initiate a communication between e.g. remote server (comprising e.g. active pages) and the third computer program (providing a home client application). For example, the home application (or the remote server) contains an online (web) shop which sells voices, maps, etc. This web shop is preferably implemented using an integrated web browser. The embedded browser is instructed by the home application to download the web pages representing the shop. Furthermore, the web shop pages may contain Java script, so the downloaded pages can communicate with the remote server using e.g. so-called AJAX technology. At a certain point, however, the Java script on the page has to give certain commands to the home application client. An example command is 'download this voice' after the user has bought a voice in the web shop. While the Java script can implement the credit card processing, it cannot do the actual download and install to e.g. a navigation device, so it sends a command or requests to send the command.

The command is sent to the hope application client by first crafting a special request (e.g. in JavaScript, on the webpage in the shop) and then sending the request to a non-existent address (e.g. http://ttds). The (e.g. embedded) web browser informs its host, the home client application, about the request. The home client knows there is no such address as http://ttds, so the home client e.g. extracts the command[s] and executes them. To speed up the further processing, the dummy request to http://ttds may then be cancelled.

In addition to downloading e.g. navigation contents like maps and voices, the home client (provided by the third computer program) can also be instructed to open more web pages (e.g. a second shop page) or close them, show a popup message, switch to a certain window inside home application (e.g. the Install-To-Device panel which is useful after downloading a voice), check for a new home application version, check for updates to the device firmware, check for updates to the navigation content, check for updates to the emulator emulating the navigation device or ask and send the user credentials, by way of example.

Figure 2:
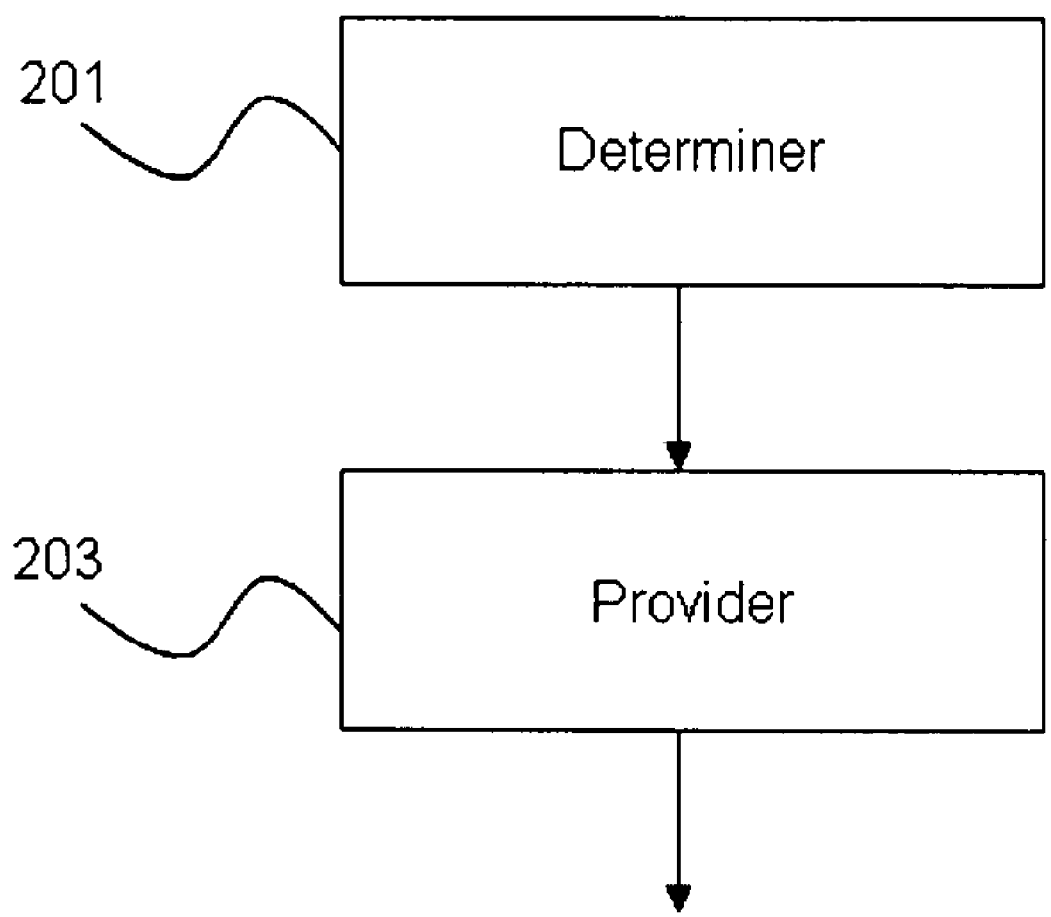
FIG. 2 shows a block diagram of a processing device.

FIG. 2 shows a block diagram of a processing device for detecting a certain computer command in a string of characters representing a uniform resource identifier (URI). The certain command may comprise a predefined command header which is followed by a command name from a plurality of predefined command names and, optionally, by one or more command arguments. The processing device comprises a determiner 201 for determining whether the string of characters comprises the predefined command header, the determiner being further configured to determine whether a substring of characters following the command header comprises the command name if the string of characters comprises the predefined command header and a provider 203 connected to the determiner 201, the provider 203 providing the predefined command header and the command name if the command header comprises a command name as the certain computer command.

The concept depicted in FIG. 2 may also be implemented using (executable) computer programs, by way of example. Furthermore, the descriptions relating to the URI also apply to URLs (uniform resource identifier).

As to the URI, the same URI can also be used as the "target" of a hyperlink on a webpage, or in an email. In that case, the URI may be activated by e.g. clicking on such a hyperlink. It is further possible to use the URI from a Java script program embedded on a webpage. However, other programs installed locally on e.g. the computer can also use such an URI. For instance, a e-mail address book plug-in can use this URI to send an address from an e-mail program to a home application program being installed on e.g. a PC.

For example, the home application (e.g. managing navigation contents) offers its own UI. However, further contents could be used for navigation purposes stored outside of the home application. For instance, an e-mail program contains an address book comprising, like the World Wide Web, a plurality of addresses. It would be useful if the home client could take advantage of those. Other parties may e.g. be interested in offering navigation contents on the World Wide Web in a format that's allows installation by the home application which may implement a custom <header>:///URI scheme that allows such access.

The URI scheme which is defined by RFC 3986 defines a framework within which multiple protocols can be implemented. Modern operating systems allow applications to register themselves as the designated handler for URIs with a given protocol. The home application (home client) provided e.g. by the thirs computer program mentioned above registers itself as the handler for URIs starting with <header>:///.

The remainder of the URI is used as a command-list in the home client. Using this approach, an address like "Amsterdam, Rembrandtplein 35" can e.g. be encoded as <header>:///Address?Amsterdam&Rembrandtplein&35.

In this regard, the characters "?" and "&" are optional and replaceable by other predefined characters or strings of characters.

Any application but home client that supports URIs may, when it encounters this URI, ask the operating system (OS) to resolve the URI. In turn the OS will inform home client that the user intents to use "Address?Amsterdam&Rembrandtplein&35". The home client then offers the user a list of choices what to do with the address. However, there are multiple navigation tasks for which an address can be used.

Using the same approach and assuming that "http://shop.<webaddress>/voices/dutch/bram.toc" is a Dutch voice, it is possible to create the following URI:

<header>:///
Install?http%3a%2f%2fshop.<webaddress>%2fvoices%2f
dutch%2fbram.toc If such a URI would appear on a webpage, and a user clicks on it, the web browser may ask the OS to forward it. The OS will ask home client to take the actions implied by Install?http%3a%2f%2fshop.<webaddress>%2fvoices%2f dutch%2fbram.toc, which in this case is the downloading of bram.toc (table of contents) from the given address.

In the following, the format specification of the commands will be described.

Referring to the generic URL format (which may be RFC 3986-compliant), a command may have the following structure:

<header>:///command-list
where:

| | |
|---|---|
| command-list = | command [ '#' command ]+ |
| command = | command-name '?' argument-list |
| command-name = | (name of a supported command, see below) |
| argument-list = | UrlEncode(argument) [ '&' argument-list ]+ |
| argument = | UTF8-string |

With reference to the legacy URL format, a command may have the following structure:

<header>://legacy-command-list
where:

| | |
|---|---|
| legacy-command-list = | legacy-command [ '&' legacy-command ]+ |
| legacy-command = | command-name '(' legacy-argument-list ')' |
| legacy-argument-list = | UrlEncode(argument) [ ',' legacy-argument-list ]+ |

Legacy URLs cannot contain the character "?" whereas proper URLs always do. This makes it possible to distinguish them. It is to be noted that these URLs are not RFC-compliant. Many URL-processing entities will change them during processing. In particular, many Windows web browsers will add an extra "/" in an attempt to make the URL conformant. Some web browsers don't support them at all. The home application tries to interpret mal-formed URLs, to cope with the wide variety of URL-enabled applications, but using the legacy URL format makes that approach more complicated.

The commands may have the following structure and arguments:

Structure: EMailContact?folder-ID&entry-ID
Arguments: EMail contact IDs.

The home application will retrieve the contact data from the e-mail program and ask the user what to do with it (show on map, navigate to, add as favourites, etc).

Structure: Address?city&street&number
Arguments: address data.

The home application will ask the user what to do with the address (show on map, navigate to, add as favourites, etc).

Structure: ShowOnMap?city&street&number
Arguments: address data.
At least one of city or street must be non-empty.

Structure: NavigateTo?city&street&number
Arguments: address data.
At least one of city or street must be non-empty.

Structure: AddFavourite?favourite-name&city&street&number
Arguments: name of the favourite and address data.
At least one of city or street must be non-empty.

Install?URL
Arguments: HTTP URL of the TOC description for an item to download, and install if a device is connected.

The resource indicated by the URL has MIME-type "text/xml".

The TOC (table of contents) format may be specified by e.g. an XML schema in the file "TOC format.xsd".

The following type of items can be installed by a user (e.g. $3^{rd}$ parties): POI (points of interest) data sets, voices, colour schemes.

Structure: Execute?URL
Arguments: HTTP URL of a textfile containing the actual command-list The resource indicated by the URL has MIME-type "text/plain".

This command can be used e.g. if passing the commands as part of the URL would yield a too long URL.

When the Execute( ) command-name is used in a legacy-command, the URL may provide a legacy-command-list in response thereto.

Structure: SwitchTab?Tabname
Arguments: name of a server-created tab.

The home application will switch to this tab if present. If it's not present, the home application will remember the name and switch to the tab once the server does create it. The home application will remember only one name; a second SwitchTab command will replace the first.

Structure: <user or host name>Page?Tabname&hostname&URL-path&anchor
Arguments: Tabname of the newly created tab, hostname, path (relative to the hostname) and URL anchor.

The home application first checks if a tab with the given tabname exists, or else it creates one. This tab then has its URL set to http://hostname.<webaddress>/URL-path#anchor The home application may reject hostnames with non-alphanumeric characters which prevents name injection. E.g. the hostname "badguys.com/ignore" may be rejected because "." and "/" are invalid.

As will be addressed below, the commands may be provided with a cryptographic signature allowing verifying the commands. For example, the following command structures can be used:

Structure: <PublicKeyIdentifier>?command-list&signature

Arguments: a command-list and a signature.

This command is used for executing a list of commands that can only be performed by a user. The signature confirms the authenticity of the command-list signature=Sign<PrivateKey>(command-list)

It is to be noted that anyone can verify a signature (with the public key).

Sign<PrivateKey>(command-list) may be implemented as follows:

The command list is an UTF-8 string and hence expressible as a byte-sequence. The command list shall not be URL-encoded when used as the input of Sign<PrivateKey>.

With reference to the encoding scheme, the SHA-256 hash H of this byte-sequence is calculated (256 bits). Furthermore, using the private key (Q,M), the signature value ($Q^H$ modulo M) is calculated. The signature is stored as a Base-64 encoded little-endian sequence of bytes (padding is neither required nor added, to keep the URL short). Like all arguments, the command-list and signature arguments will be URL-encoded. When the <PublicKeyIdentifier>( ) command-name is used in a legacy-command, the first argument should preferably be a legacy-command-list.

The decryption is the reverse process: The home application holds the public key (P, M). The SHA-256 hash H of the command-list (after URL decoding) is calculated (256 bits). Using the public key (P, M) the countersignature ($p^H$ modulo M) is calculated. The signature is Base-64 decoded to get ($Q^H$ modulo M), wherein the product ($P^H \cdot Q^H$) modulo M is calculated. The signature is accepted if it matches the countersignature, which means ($P^H \cdot Q^H$) modulo M equals 1.

The above concept is also applicable if command arguments are not present. Furthermore, the command name may comprise a number of parameters assigning semantics to arguments. For example, every argument may be matched with a parameter in two possible ways referred to as the positional approach and the named approach in the following, which is similar to a function call syntax in programming languages.

In reference to the positional syntax, if a command name has e.g. three parameters, and three arguments are provided, then the first parameter is matched with the first argument, etc. For example, the address command has three parameters: City, Street and HouseNumber. The actual URI will then contain three arguments, wherein the first argument is interpreted as the City name, etc.

Alternatively, the following syntax may be supported:

Address?Street=RembrandtPlein&City=Amsterdam.

In this case, every argument includes the parameter name. Hence, these are known as "named" arguments.

Furthermore, the above mentioned parameters can be designated as being mandatory parameters. This means that there must be a matching argument. Instead of e.g. "?" other parameters may be used to indicate the separation between command name and command arguments. Furthermore, also other mechanisms like mandating a fixed length command name (which implies that the first letter after that position starts the first command argument) may be employed.

A <header>:///URI in general may contain one or more commands. Thus, the character "#" (or any other character, for example "and") can be used to concatenate commands.

Figure 3:
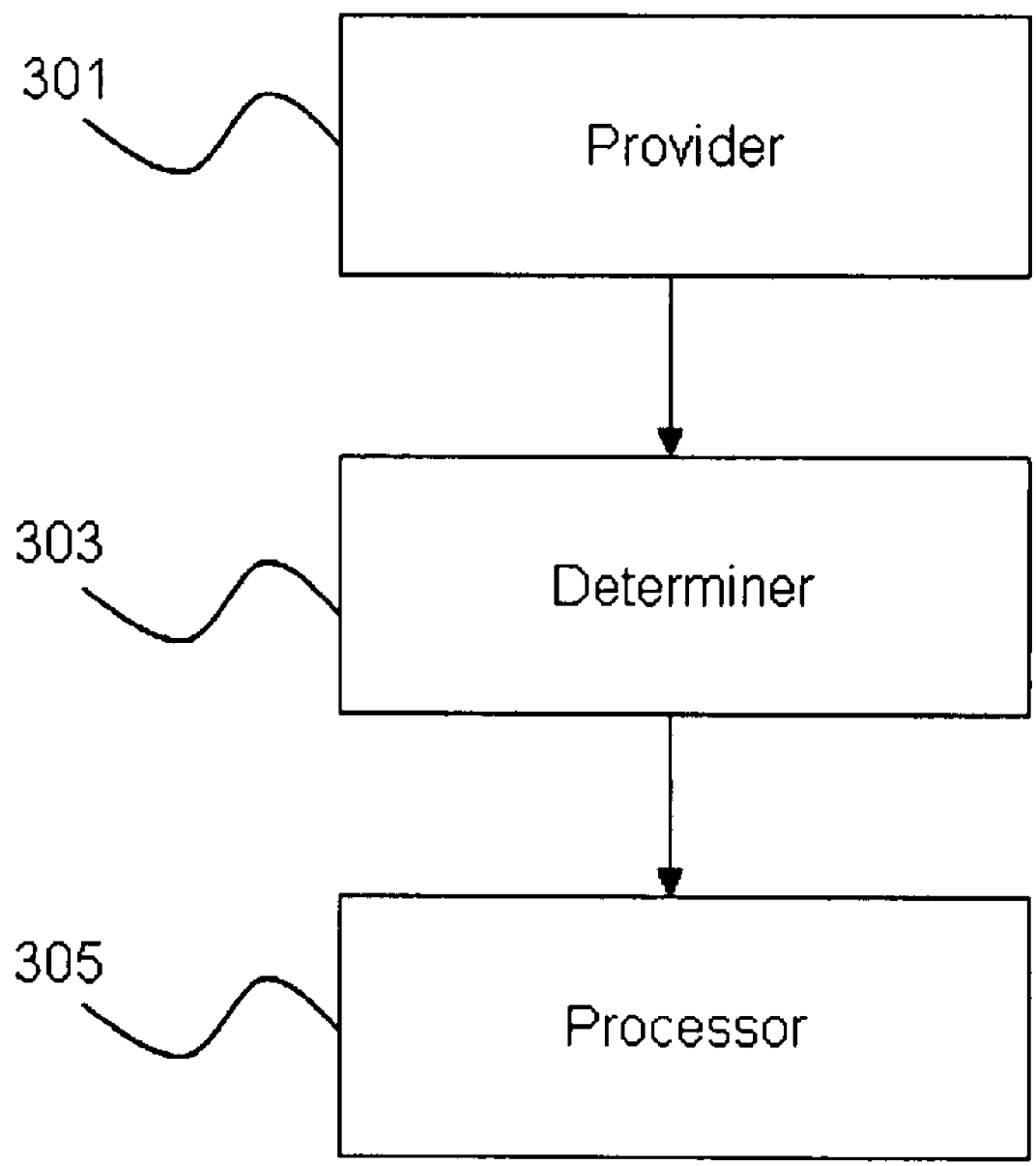
FIG. 3 shows a block diagram of a communication device.

FIG. 3 shows a block diagram of a communication device for emulating a behavior of a navigation device in response to executing a device firmware program installed on the navigation device. The communication device comprises a provider 301 for providing information relating to the device firmware program, a determiner 303 connected to the provider 301 for determining whether a current firmware program installed on the communication device corresponds to the device firmware program installed on the navigation device and a processor 305 connected to the determiner 303 for executing the current firmware program on the communication device in order to emulate the behavior of the navigation device if the current firmware program corresponds to the device firmware.

The communication device may be programmably arranged and configured to execute the above-mentioned home application which may control the emulation process.

The emulation concept further supports the portability and the usability of the navigation device. Usually, the (portable) navigation device has e.g. a small screen which also serves as its input. In contrast, e.g. a (desktop) computer (e.g. a PC) has a much larger screen and more advanced input methods. Therefore, many tasks that could be performed on the navigation device are more easily done, if the navigation device is controlled by the computer which may e.g. be connected to the navigation device. In addition, the processor (e.g. the CPU) of the computer is a faster.

Furthermore, the emulation concept may be programmably implemented and e.g. embedded into the home application to effectively enable e.g. the computer (representing an embodiment of the communication device) to control the navigation device using the more capable computer resources.

When the navigation device is connected to the home client (or to the communication device), the firmware version installed on the navigation device is determined. If the home client has the computer equivalent version of the firmware, that firmware is then started. If no equivalent version is available, but a network connection (e.g. an internet connection) is available, the home client may ask the home server what the equivalent version is, and where that can be downloaded.

Figure 4:
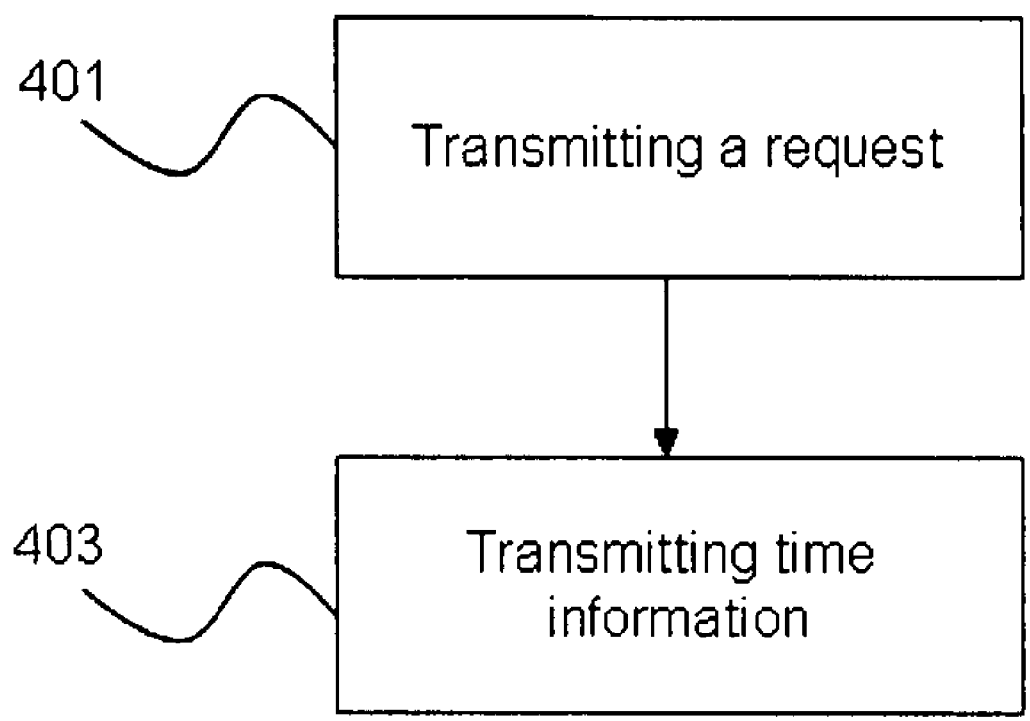
FIG. 4 demonstrates a method for providing certain information.

FIG. 4 demonstrates a Method for providing certain information to a network entity from a further network entity. The method comprises transmitting 401 a request for the certain information from the network entity via a communication network to the further network entity and transmitting 403 time information from the further network entity to the network entity via the communication network, the time information indicating a certain time instant at which to connect to the further network entity for obtaining the certain information. The method may be e.g. implemented in software (e.g. as a home application) which, when executed, performs the method steps.

For example, a user can ask the home application for a daily traffic report (certain and user-specific information) on certain roads. The home application will then e.g. daily at the requested time, show a report on traffic jams and incidents on the requested roads. When the traffic report request is made in the home client, the client e.g. immediately forwards the request to the server. The request data is stored on the server, for the given user. In response to the request, the server sends back a time at which home client should poll the home server. Also, whenever the same user logs in again, home server will tell home client at which time to poll the server. The actual traffic report is sent by the server in reaction to the poll report. The home application e.g. formats the traffic report for displaying purposes. The result is that all data is stored server-side, but the connection nevertheless is initiated by the client. This allows the home client, when executed as a software program on a computer to show traffic alerts in spite of firewalls or popup-blockers.

For determining user information in order to obtain e.g. user specific information, login credentials manually entered by a user may be exploited. Alternatively, the home client may have stored them earlier. Either way, if the home client has login credentials, it may send them automatically whenever the home client provided by a software program is executed. If the home client does not have the credentials yet, the user can manually initiate the login. In that case, the home client will prompt for credentials, send them immediately to the remote server and also store them for future use.

Figure 5:
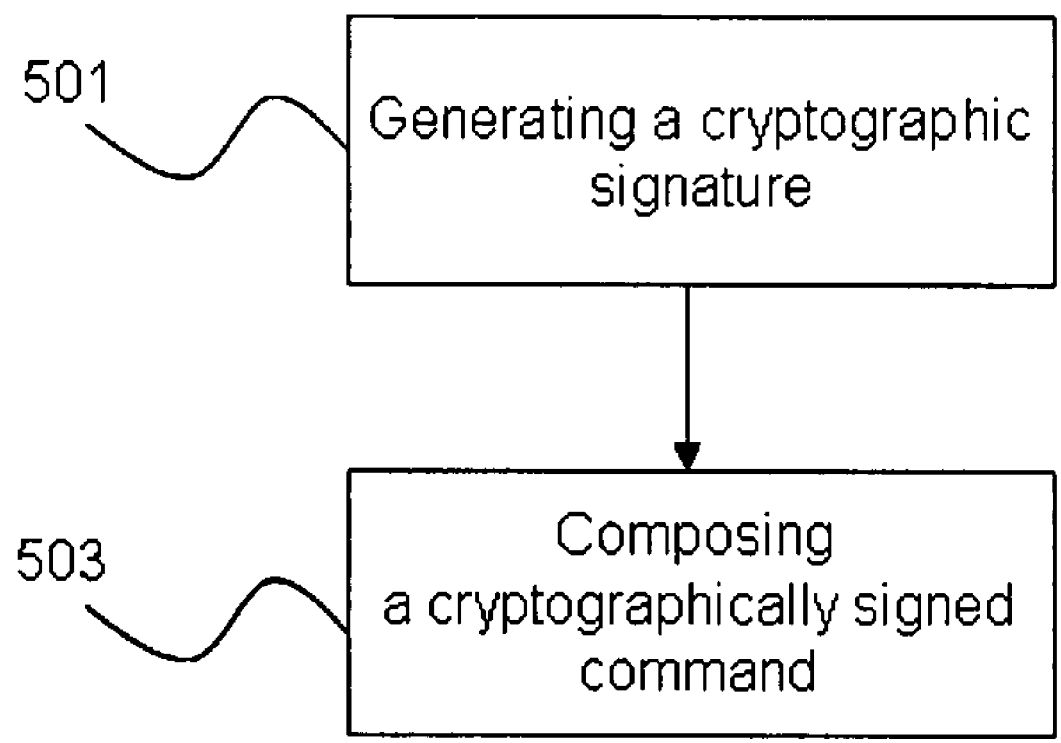
FIG. 5 demonstrates a method for providing a cryptographically signed command.

FIG. 5 demonstrates a method for providing a cryptographically signed command, the command comprising a command name and at least one command argument. The method comprises generating 501 a cryptographic signature of the command name and composing 503 (e.g. concatenating) the cryptographically signed command using the command name, the signature and the at least one command argument.

For example, the encrypting and decrypting schemes described in connection with the embodiment of FIG. 2 can be employed for providing and verifying the digital signature.

For example, an authenticated URI may comprise a command with two arguments; the first argument is a string of characters that is a command. The second argument is the "digital signature" of the first argument. Preferably, standard public key cryptography is employed for signing the first argument using a private key which provides the digital signature. For example, the home client having the matching public key may countersign the first argument. The signature and counter-signature are complementary if and only if the keys are equal. If this is the case, the home client trusts the first command, and will execute it even if the command in the first argument would be considered dangerous.

The above authenticated URI mechanism may also be used to update the firmware on the navigation device. Preferably, it may be allowed to copy or to update command, however, without altering it. Thus, e.g. updating the navigation device with wrong firmware may cause irreparable harm to the navigation device.

According to an embodiment, the signed command then used as a first argument in another command (cryptographically signed command), wherein the signature is used as e.g. a second argument. The structure of the cryptographically signed command may be as follows:

verify_command(commandname1(argument1,argument2,argument3), signature)

Thee signature (second argument to the outer command) may be generated by applying e.g. a private(secret) key to the command that should be authenticated, i.e.: commandname1(argument1,argument2,argument3)+private_key=signature In order to generate a countersignature, a similar algorithm may be used:

commandname1(argument1,argument2,argument3)+public_key=countersignature.

The command is verified if the signature and countersignature correspond to each other. Preferably, standard public-key cryptography approaches like e.g. the RSA or the DSA algorithm may be employed for the signature purposes.

For example, the command
<header>:///
<PublicKeyIdentifier>?Install%3fhttp%3a%2f%2fintranet%2fplus%2fdocuments%2ftemp%2fnavcore_6.522.7709.go510-go710.toc&JYrSIQ is considered, wherein <PublicKeyIdentifier>is an actual command-name used for commands authenticated by a user. The first argument is
Install%3fhttp%3a%2f%2fintranet%2fplus%2fdocuments%2ftemp%2fnavcore_6.522.7709.go510-go710.toc This is the embedded command. The actual command name is install, the "?" is encoded as %3f and the remainder is the argument of the install command. The user signed the install command with its private key, and the signature that came out was JYrSIQ. To verify the command, a countersignature may be generated. The countersignature will match if the command was correctly signed.

If another user tries to edit the command, for example
<header>:///
<PublicKeyIdentifier>?Install%3fhttp%3a%2f%evil.com%2fnavcore_6.522.7709.go510-go710.toc&JYrSIQ, a different counter-signature will be calculated which does not matches the signature. Thus, the installation of the content from evil.com will be rejected.

Figure 6:
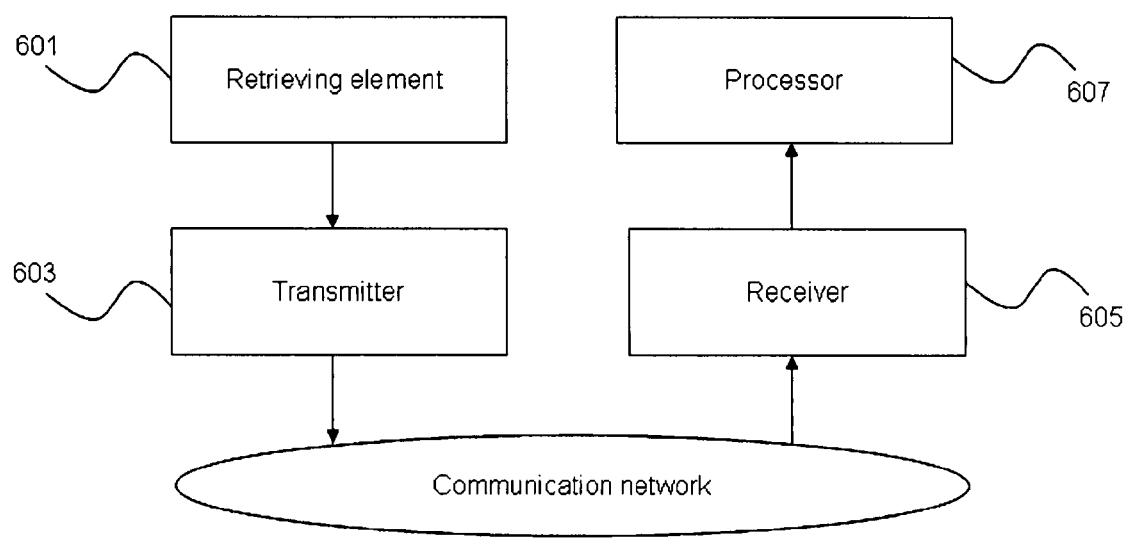
FIG. 6 shows a block diagram of a communication device for updating navigation contents.

FIG. 6 shows a communication device for updating current navigation contents stored in a navigation device. The communication device comprises a retrieving element 601 for retrieving information indicating current navigation contents from the navigation device, a transmitter 603 connected to the retrieving element for transmitting the information indicating the current navigation contents to a remote network device via a communication network, a receiver 605 for receiving updated navigation contents from the remote communication device and a processor 607 for displaying information relating to the updated navigation contents or for installing the updated navigation contents on the navigation device.

The information indicating current or updated navigation content may be transmitted as a table of contents file indicating e.g. a content type, a content name, a content size or a content version. Furthermore, information related to the device identification or user identification may be transmitted.

The remote communication device (e.g. a server) may comprise a data base storing e.g. a list of navigation items available (e.g. maps, routing information, GPS fixes etc.). Furthermore, the remote server may check the entitlement of the user due to e.g. subscription status or the entitlement of the navigation device due to e.g. the device identification prior to transmitting updated content.

As mentioned above, the content information may be summarized in a TOC-file (table of contents). An exemplary TOC-file is listed below:

```
<Program>
<Id>13214</Id>
<Version>1.2</Version>
<Target>target</Target>
<Name>NameOfItem</Name>
<Preview>http://download.<download_address>/somepreview.exe</Preview>
<Location>http://download.<web address>/someitem.cab</Location>
<Size>546484</Size>
</Program>
<Map>
<Id>8977</Id>
<Version>1.2</Version>
<Target>Thistarget</Target>
<Name>Benelux</Name><Category>Category</Category>
<Preview>http:// download.<download_address> /mappreview.png</Preview>
<Location>http://download. <download_address>/mapdownload.cab</Location>
<Icon>http://download. <download_address>/mapicon.png</Icon>
<Size>46464987</Size>
<InstallRestrictions DeviceId="35265252" />
</Map>
<Voice language="en" gender="male">
<Id>4657</Id>
<Version>1.1</Version>
<Name>user_name</Name>
<Preview>http://download. <download_address>/voicepreview.mp3</Preview>
<Location>http://download. <download_address>/voicedownload.cab</Location>
<Size>468797946231</Size>
<Picture>http:// <download_address>/voicepicture.png</Picture>
<Icon>http:// <download_address>/voiceicon.png</Icon>
</Voice>
<Colorscheme>
<Id>98797</Id>
<Version>1.1</Version>
<Name>Bright Black</Name>
<Location>http://download. <download_address>/colordownload.cab</Location>
<Size>6464</Size>
</Colorscheme>
<Poi>
<Id>65446</Id>
<Version>1.3</Version>
<Name>Wifi Hotspots</Name>
<Category>Connectivity</Category>
<Location>http://download. <download_address>/poidownload.cab</Location>
<Size>54567</Size>
</Poi>
</Toc>
```

The field <InstallRestrictions DeviceId="35265252"/> specifies restrictions on the installability of this item (apart from the <Target>element). It has no content.

Optional attributes are: deviceId (string) denoting that the item can only be installed on a device with this device ID and minNavigatorVersion (string) denoting that the minimum version of the navigator program that must be installed for this item to be installed.

Figure 7:
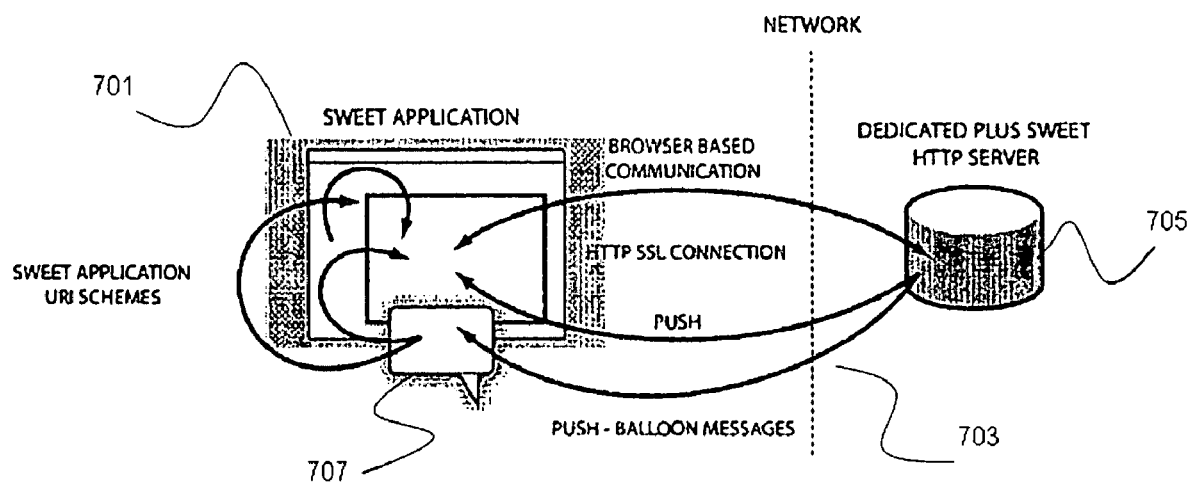
FIG. 7 shows a block diagram of a communication scenario.

FIG. 7 shows a block diagram of a communication scenario with an executable application program 701 (sweet application, home application) running e.g. on a computer which communicates via a communication network 703 with a remote server 705 for interchanging information as depicted in FIG. 7. The server 707 may provide messages exposing in either balloon messages 707 or in browser components e.g. provided by the application program 701.

The particular combinations of elements and features in the above described embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A communication device for emulating a behavior of a navigation device in response to executing a device firmware program installed on the navigation device, the communication device comprising:
    a provider for providing information relating to the device firmware program;
    a determiner for determining whether a current firmware program installed on the communication device corresponds to the device firmware program installed on the navigation device; and
    a processor for executing the current firmware program on the communication device in order to emulate the behavior of the navigation device if the current firmware program corresponds to the device firmware.

2. The communication device according to claim 1, the processor being further configured to establish a network connection to a remote network entity via a communication network to obtain an updated version of the current firmware program if the current firmware program does not correspond to the device firmware program, the processor being further configured to execute the updated version of the current firmware program to emulate the behavior of the navigation device.

3. The communication device according to claim 1, the provider being configured to connect to the navigation device for retrieving information indicating the device firmware program.

4. The communication device according to claim 1, the determiner being configured to determine whether the current firmware program installed on the communication device corresponds to the device firmware upon a basis of a table of contents file comprising information indicating the device firmware program or upon a basis of a table of contents file comprising information indicating the current firmware program.

5. The communication device according to claim 1, the processor being further configured to control the navigation device upon a basis of the emulation of the behavior of the navigation device.

6. A method for emulating a behavior of a navigation device in response to executing a device firmware program installed on the navigation device, the method comprising:
providing information relating to the device firmware program from the navigation device;
determining whether a current firmware program corresponds to the device firmware installed on the navigation device; and
executing the current firmware program on a communication device in order to emulate the behavior of the navigation device if the current firmware program corresponds to the device firmware.

7. The method according to claim 6, comprising establishing a network connection to a remote network entity via a communication network to obtain an updated version of the current firmware program if the current firmware program does not correspond to the device firmware program and executing the updated version of the current firmware program to emulate the behavior of the navigation device.

8. The method according to claim 6, comprising connecting to the navigation device for retrieving information indicating the device firmware program.

9. The method according to claim 6, comprising determining whether the current firmware program to the device firmware program upon a basis of a table of contents file comprising information indicating the device firmware program or upon a basis of a table of contents file comprising information indicating the current firmware program.

10. A computer program for performing the method according to claim 6 when the computer program runs on a computer.

11. A programmably arranged communication device for emulating a behavior of a navigation device in response to executing a device firmware program installed on the navigation device, the programmably arranged communication device being configured to execute a first computer program for providing information relating to the device firmware program, to execute a second computer program for determining whether a current firmware program available to the programmably arranged communication device corresponds to the device firmware program installed on the navigation device and to execute the current firmware program on the communication device in order to emulate the behavior of the navigation device if the current firmware program corresponds to the device firmware program.

12. The programmably arranged communication device according to claim 11, the second computer being configured to determine whether the current firmware program installed on the communication device corresponds to the device firmware upon a basis of a table of contents file comprising information indicating the device firmware program or upon a basis of a table of contents file comprising information indicating the current firmware program.

* * * * *